US009074136B2

United States Patent
Zhou et al.

(10) Patent No.: US 9,074,136 B2
(45) Date of Patent: Jul. 7, 2015

(54) SILICATE LUMINESCENT MATERIALS AND PREPARATION METHODS THEREOF

(75) Inventors: Mingjie Zhou, Guangdong (CN); Wenbo Ma, Guangdong (CN); Qiurong Liao, Guangdong (CN)

(73) Assignee: Ocean's King Lighting Science & Technology Co., Ltd., Guangdong (CN)

(*) Notice: Subject to any disclaimer, the term of this patent is extended or adjusted under 35 U.S.C. 154(b) by 259 days.

(21) Appl. No.: 13/806,375

(22) PCT Filed: Aug. 13, 2010

(86) PCT No.: PCT/CN2010/075972
§ 371 (c)(1),
(2), (4) Date: Dec. 21, 2012

(87) PCT Pub. No.: WO2012/019359
PCT Pub. Date: Feb. 16, 2012

(65) Prior Publication Data
US 2013/0092876 A1    Apr. 18, 2013

(51) Int. Cl.
C09K 11/79 (2006.01)
C09K 11/77 (2006.01)
C09K 11/02 (2006.01)
C09K 11/87 (2006.01)
B82Y 30/00 (2011.01)

(52) U.S. Cl.
CPC ............ *C09K 11/7721* (2013.01); *C09K 11/025* (2013.01); *C09K 11/7774* (2013.01); *B82Y 30/00* (2013.01); *C09K 11/7792* (2013.01); *C09K 11/87* (2013.01); *Y10S 977/773* (2013.01)

(58) Field of Classification Search
USPC .................................................. 252/301.4 F
See application file for complete search history.

(56) References Cited

U.S. PATENT DOCUMENTS
2004/0251809 A1* 12/2004 Shimomura et al. .......... 313/485

FOREIGN PATENT DOCUMENTS
CN            101677117 A       3/2010

OTHER PUBLICATIONS

International Search Report for corresponding International Application No. PCT/CN2010/075972 mailed May 19, 2011.
Min et al., "Au@Y2O3:Eu3+ rare earth oxide hollow submicrospheres with encapsulated gold nanoparticles and their optical properties", ScienceDirect, Solid State Sciences, vol. 11, No. 1, 2009, pp. 96-101.

(Continued)

*Primary Examiner* — Carol M Koslow
(74) *Attorney, Agent, or Firm* — Renner, Otto, Boisselle & Sklar, LLP

(57) ABSTRACT

Silicate luminescent materials and preparation methods thereof are provided. The luminescent materials are represented by the general formula: $M^2_a M^3_b Si_c O_{[a+3(b+x)/2+2c]}:xCe^{3+}, yM^0$, $M^2$ is at least one selected from Ca, Sr, Ba, Mg and at least contains Ca, $M^3$ is Sc, Sc and Y, $M^0$ is one selected from metal nano particles of Ag, Au, Pt, Pd or Cu, wherein $2.8 \le a \le 3.2$, $1.8 \le b \le 2.1$, $2.9 \le c \le 3.3$, $0.01 \le x \le 0.2$ and $1 \times 10^{-4} \le y \le 1 \times 10^{-2}$. Compared to the luminescent materials in the prior art, the said luminescent materials have higher luminous efficiency and more stable performance and structure. The said methods have simple technique and low cost, therefore are appropriate to be used in industry.

11 Claims, 3 Drawing Sheets

(56) References Cited

OTHER PUBLICATIONS

Aslan et al., "Fluorescent Core—Shell Ag@SiO2 Nanocomposites for Metal-Enhanced Fluorescence and Single Nanoparticle Sensing Platforms", J. Am Chem. Soc., 2007, vol. 129, No. 6, pp. 1524-1525.

Lipowska et al., "Energy transfer and surface plasmon resonance in luminescent materials based on Tb(III) and Ag or Au nanoparticles in silica xerogel", Journal of Non-Crystalline Solids. vol. 354, Aug. 11, 2008, pp. 4383-4387.

Liu et al., "Synthesis and luminescence of sub-micron sized Ca3Sc2SicO12:Ce green phosphors for white light-emitting diode and field-emission display applications", Journal of Alloys and Compounds, vol. 504, Jun. 11, 2010, pp. 488-492.

Liu et al., "Structural and luminescent properties of gel-combusion synthesized green-emigging Ca3Sc2SicO12 : Ce3+ phosphor for solid-state lighting", Journal of Physics D:Applied Physics, Nov. 26, 2009, vol. 42, No. 24, 245102.

Extended European Search Report for corresponding European Application No. 10855780.2 dated May 15, 2014.

Hayakawa et al., "Enhancement of 5Do-7Fj Emissions of Eu3+ Ions in the Vicinity of Polymer-Protected Au Nanoparticles in Sol-Gel-Derived B2O3—SiO2 Glass", Journal of Physical Chemistry B, Jul. 13, 2004, vol. 108, No. 31, pp. 11301-11307.

* cited by examiner

SILICATE LUMINESCENT MATERIALS AND PREPARATION METHODS THEREOF

TECHNICAL FIELD

The present invention belongs to the technical field of luminescent materials, in particular relates to a silicate fluorescent powder and the method for preparing the same.

BACKGROUND

White-light LEDs (Light Emitting Diodes) have advantages of low energy consumption, long service life, and environment friendliness. Along with the improvement of the luminescent efficiency and the decrease of the production cost, the white-light LED is predicted to become a new generation of illuminating light source after incandescent lamp, fluorescent lamp, and high intensity discharge lamp. Similar to the replacement of conventional vacuum tubes with transistors, the replacement of conventional vacuum light sources with solid light source white-light LEDs is a disruptive technical innovation, and will initiate a revolution in the illuminating field.

Currently, the most commonly used method to achieve white light in an LED is to combine a blue-light LED chip with a fluorescent powder which can be effectively excited by blue lights and emits yellow lights to form a white-light LED. Although a relatively high luminescent efficiency can be obtained by such a method, a white-light LED with warm white light and high color rendering cannot be obtained due to the lack of red lights in its emission spectrum. Another method to achieve a white-light LED is the combination of a blue-light LED chip with green-light and red-light fluorescent powders to obtain a white-light LED with high color rendering and low color temperature. However, the green-light fluorescent powder and the nitride red-light fluorescent powder have low luminescent brightness and high production cost. The other main disadvantages of the green-light fluorescent material for a white-light LED are narrow full width at half maximum, and the currently used luminescent materials having wide emission spectra show low luminescent efficiencies.

SUMMARY

In view of the above, the present invention provides a silicate fluorescent powder which is doped with metal nanoparticles, and which has high luminescent efficiency and stable performance and structure.

In addition, the present invention provides a method for preparing a silicate fluorescent powder with a simple and low-cost process.

The technical solutions of the present invention for solving the above technical problem are as follows.

A silicate fluorescent powder has a chemical formula of $M^2_a M^3_b Si_c O_{[a+3(b+x)/2+2c]}:xCe^{3+}$ with $yM^0$, wherein $2.8 \leq a \leq 3.2$, $1.8 \leq b \leq 2.1$, $2.9 \leq c \leq 3.3$, $0.01 \leq x \leq 0.2$, $1 \times 10^{-4} \leq y \leq 1 \times 10^{-2}$, $M^2$ is a combination of at least one of Sr, Ba and Mg with Ca; $M^3$ is Sc or a combination of Sc with Y; $M^0$ represents a metal nanoparticle selected from one of Ag, Au, Pt, Pd and Cu nanoparticles.

In addition, a method for preparing a silicate fluorescent powder comprises the steps of:

providing a $M^0$ metal nanoparticle sol;

providing a source compound of $M^2$, a source compound of $M^3$, a source compound of Si, a source compound of Ce and the $M^0$ metal nanoparticle sol according to stoichiometric ratio of corresponding elements in a chemical formula of $M^2_a M^3_b Si_c O_{[a+3(b+x)/2+2c]}:xCe^{3+}$, and $yM^0$, wherein $2.8 \leq a \leq 3.2$, $1.8 \leq b \leq 2.1$, $2.9 \leq c \leq 3.3$, $0.01 \leq x \leq 0.2$, $1 \times 10^{-4} \leq y \leq 1 \times 10^{-2}$, $M^2$ is a combination of at least one of Sr, Ba and Mg with Ca; $M^3$ is Sc or a combination of Sc with Y; $M^0$ represents a metal nanoparticle selected from one of Ag, Au, Pt, Pd and Cu nanoparticles;

adding the $M^0$ metal nanoparticle sol and the source compound of $M^2$, a source compound of $M^3$ and a source compound of Ce to an alcoholic solution of the source compound of Si to give a mixed solution;

adjusting the pH of the mixed solution to be acidic, heating in a water bath to conduct reaction, and drying to give a precursor;

pre-calcinating the precursor; and calcinating the pre-calcinated precursor in a reductive atmosphere to give the silicate fluorescent powder.

Comparing with the prior art, the silicate fluorescent powder of the present invention has at least the following advantages:

(1) by being doped with metal nanoparticles, the fluorescent powder of the present invention has a relatively high luminescent efficiency;

(2) the fluorescent powder of the present invention has a relatively emission spectrum; by coating the blue-light LED chip with this fluorescent powder and a red-light-emitting fluorescent powder, white light with high color rendering and low color temperature may be obtained;

(3) the fluorescent powder of the present invention has stable structure and performance; after being treated by water-soaking and high-temperature heating, its performance keeps substantially unchanged; and (4) in the method for preparing the silicate fluorescent powder, the fluorescent powder is obtained by a solid phase method in which the corresponding reactants are added in certain proportions; therefore, the preparation process is simple with low cost, and has broad production and application prospects.

BRIEF DESCRIPTION OF THE FIGURES

The present invention will be further described in combination with the following figures and embodiments, wherein.

SPECIFIC EMBODIMENTS

Figure 1:
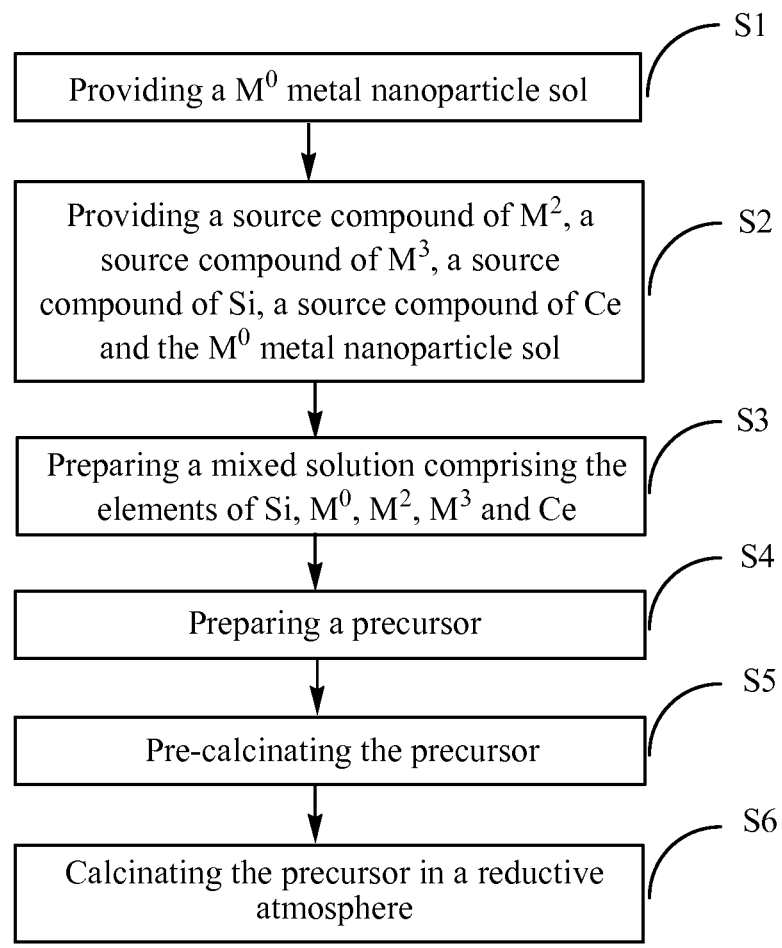
FIG. 1 shows a flow chart of the method for preparing the silicate fluorescent powder of the present invention.

In order to make the objectives, the technical solutions and the advantages of the present invention more obvious, the present invention will be further described in detail in combination with the Figures and the embodiments. It shall be understood that the specific embodiments described herein are only to illustrate rather than to limit the present invention.

The present embodiment provides a silicate fluorescent powder having a chemical formula of $M^2_a M^3_b Si_c O_{[a+3(b+x)/2+2c]}{:}xCe^{3+}$ with $yM^0$, wherein $2.8 \le a \le 3.2$, $1.8 \le b \le 2.1$, $2.9 \le c \le 3.3$, $0.01 \le x \le 0.2$, $1 \times 10^{-4} \le y \le 1 \times 10^{-2}$, $M^2$ is a combination of at least one of Sr, Ba and Mg with Ca; $M^3$ is Sc or a combination of Sc with Y; $M^0$ represents a metal nanoparticle selected from one of Ag, Au, Pt, Pd and Cu nanoparticles.

In the present embodiment, by incorporating metal nanoparticles into the silicate fluorescent powder, the luminescent intensity of the fluorescent powder is increased by the resonance effect of the surface plasmon (SP) of the metal nanoparticles. The surface plasmon generated on the surface of the metal nanoparticles is a wave propagating along the interface between the metal and the medium and the amplitude thereof exponentially decays with the distance from the interface. When the fluorescent powder is incorporated with metal particles, the surface plasmon polaritons (SPPs) would undergo significant changes in their properties, dispersion relation, excitation mode, coupling effect, etc. The electromagnetic field induced by the SPPs can not only limit the propagation of light wave in the sub-wavelength sized structure, but also generate and control the electromagnetic radiation of a wave band from optical frequency to microwave, thereby achieving the active control of the light propagation, and increasing the intensity of the optical state of the fluorescent powder and increasing its spontaneous emission rate. In addition, through the coupling effect of the surface plasmon, the internal quantum efficiency of the fluorescent powder can be significantly increased, thereby increasing the luminescent intensity of the silicate fluorescent powder.

The above silicate fluorescent powder shows strong absorption in the range of 400~500 nm, and is very suitable for the excitation of blue-light LED chips, and may be used in white-light LEDs. Comparing with the prior art, it has at least the following advantages:

(1) by being doped with metal nanoparticles, the fluorescent powder of the present invention has a relatively high luminescent efficiency;

(2) comparing with the currently used silicate green fluorescent powder doped with $Eu^{2+}$, the silicate fluorescent powder of the present invention has a relatively broad emission spectrum; the reason is that the 4f energy level of $Ce^{3+}$ in this kind of silicate is split into $^2F_{7/2}$ and $^2F_{5/2}$, resulting in that the emission peaks of $Ce^{3+}$ include a main peak at about 505 nm and a shoulder peak at about 540 nm, i.e. a relatively broad emission spectrum; by coating the blue-light LED chip with this silicate fluorescent powder and a red-light-emitting fluorescent powder, white light with high color rendering and low color temperature may be obtained; and (3) the fluorescent powder of the present invention has stable structure and performance; after being treated by water-soaking and high-temperature heating, its performance keeps substantially unchanged.

In addition, the method for preparing the silicate fluorescent powder of the present invention is as shown in FIG. 1, and the method comprises the steps of:

S1. providing a $M^0$ metal nanoparticle sol;

S2. providing a source compound of $M^2$, a source compound of $M^3$, a source compound of Si, a source compound of Ce and the $M^0$ metal nanoparticle sol according to stoichiometric ratio of corresponding elements in a chemical formula of $M^2_a M^3_b Si_c O_{a+3(b+x)/2+2c}{:}xCe^{3+}$ and $yM^0$, wherein $2.8 \le a \le 3.2$, $1.8 \le b \le 2.1$, $2.9 \le c \le 3.3$, $0.01 \le x \le 0.2$, $1 \times 10^{-4} \le y \le 1 \times 10^{-2}$, $M^2$ is a combination of at least one of Sr, Ba and Mg with Ca; $M^3$ is Sc or a combination of Sc with Y; $M^0$ represents a metal nanoparticle selected from one of Ag, Au, Pt, Pd and Cu nanoparticles;

S3. adding the $M^0$ metal nanoparticle sol and the source compound of $M^2$, a source compound of $M^3$ and a source compound of Ce to an alcoholic solution of the source compound of Si to give a mixed solution;

S4. adjusting the pH of the mixed solution to be acidic, heating in a water bath to conduct reaction, and drying to give a precursor;

S5. pre-calcinating the precursor; and

S6. calcinating the pre-calcinated precursor in a reductive atmosphere to give the silicate fluorescent powder.

In step S1 of the above method for preparing the silicate fluorescent powder, the process for preparing the $M^0$ metal nanoparticle sol preferably comprises the steps of: dissolving a source compound of $M^0$, followed by adding an auxiliary which is preferably at least one of polyvinylpyrrolidone (PVP), sodium citrate, hexadecyl trimethyl ammonium bromide, sodium dodecylsulfate and sodium dodecylsulphonate, and a reductant; after completion of the reaction, treating with a surface treating agent to give the $M^0$ metal nanoparticle sol.

A more preferred solution for preparing the $M^0$ metal nanoparticle sol is as follows:

1) weighing a source compound of $M^0$ and dissolving it in a solvent to prepare a solution which is further diluted to a concentration of $1 \times 10^{-4}$ mol/L~$1 \times 10^{-2}$ mol/L, wherein the solvent is preferably water or a volatile alcohol wherein the volatile alcohol is preferably, but not limited to, ethanol;

2) dissolving one or more auxiliaries in the solution obtained in 1) under magnetic stirring;

3) weighing corresponding mass of a reductant material and dissolving it in a solvent to prepare a solution of the reducatant having a concentration in the range of $1 \times 10^{-3}$ mol/L~0.1 mol/L; wherein the solvent is preferably water or a volatile alcohol wherein the volatile alcohol is preferably, but not limited to, ethanol;

4) adding the solution of the reducatant obtained in 3) into the solution obtained in 2) under magnetic stirring with molar ratio of the reactant to the $M^0$ metal ion as 1.2:1~4.8:1 and reacting for 10 min~45 min to obtain a reaction solution containing the $M^0$ metal nanoparticles in a concentration of $1 \times 10^{-4}$ mol/L~$1 \times 10^{-2}$ mol/L; and 5) weighing the above reaction solution obtained in 4), adding a surface treating agent and stirring for 3 h~24 h to give the $M^0$ metal nanoparticle sol.

The content of the above added auxiliary in the $M^0$ metal nanoparticle sol is preferably $1.5 \times 10^{-4}$ g/mL~$2.1 \times 10^{-3}$ g/mL; the molar ratio of the added reductant to the $M^0$ metal ion is preferably 1.2:1~4.8:1; and the content of the added surface treating agent in the $M^0$ metal nanoparticle sol is preferably $1.5 \times 10^{-4}$ g/mL~$2.1 \times 10^{-3}$ g/mL.

The above source compound of $M^0$ is preferably at least one of silver nitrate, chloroauric acid, chloroplatinic acid, palladium chloride and cupric nitrate; the reductant is preferably at least one of hydrazine hydrate, ascorbic acid and sodium borohydride; and the surface treating agent is preferably at least one of polyvinylpyrrolidone and 3-aminopropyl trimethyl siloxane.

In step S2 of the above method for preparing the silicate fluorescent powder, the source compound of Si is preferably, but not limited to, tetraethyl orthosilicate; the source compound of $M^2$ is preferably at least one of nitrate, sulfate and chloride of $M^2$; the source compound of $M^3$ is preferably at least one of nitrate, sulfate and chloride of $M^3$; and the source compound of Ce is preferably at least one of nitrate, sulfate and chloride of Ce.

In step S3 of the above method for preparing the silicate fluorescent powder, the alcohol for the alcoholic solution of the source compound of Si is preferably a volatile alcohol which is preferably, but not limited to, ethanol.

In step S4 of the above method for preparing the silicate fluorescent powder, the pH of the mixed solution is preferably adjusted to 3~6; the heating temperature of the water bath is preferably 60~95° C., and the heating means may be not only heating in a water bath, but also other common heating means in the art; and the drying temperature may be 80~120° C.

In step S5 of the above method for preparing the silicate fluorescent powder; the pre-calcination of the precursor preferably comprises milling the precursor before conducting the pre-calcination, which may improve the effects of the pre-treatment of the precursor. The temperature of the pre-calcination is preferably 700~1000° C., and the time is preferably 3~5 h.

In step S6 of the above method for preparing the silicate fluorescent powder, the temperature under which the pre-calcinated precursor is calcinated in a reductive atmosphere is preferably 1250~1500° C., and the time is preferably 2~12 h; the reductive atmosphere is preferably one of $N_2$—$H_2$ mixed reductive atmosphere, CO reductive atmosphere and $H_2$ reductive atmosphere, wherein the volume ratio of $N_2$ to $H_2$ in the $N_2$—$H_2$ reductive atmosphere is preferably, but not limited to 95:5. The objective of calcinating in the reductive atmosphere is to reduce the small amount of +4 valent Ce ion and $M^0$ ion generated during the combustion into +3 valent Ce ion and elemental $M^0$ nanoparticles, thereby giving the compound of $M^2_a M^3_b Si_c O_{[a+3(b+x)/2+2c]}:xCe^{3+}$ with $yM^0$, and effectively ensuring the luminescent performance of $M^2_a M^3_b Si_c O_{[a+3(b+x)/2+2c]}:xCe^{3+}$ with $yM^0$.

In the method for preparing the silicate fluorescent powder, the fluorescent powder is obtained by a solid phase method in which the corresponding reactants are added in certain proportions. therefore, the preparation process is simple with low cost, and has broad production and application prospects.

Various compositions of the silicate fluorescent powder and the method for the preparation thereof and the performance thereof will be illustrated by various examples.

EXAMPLE 1

Silicate fluorescent powder having a chemical formula of $Ca_{2.9}Sc_2Si_3O_{12}:0.1Ce^{3+}$ with $1\times10^{-3}$ Ag 3.4 mg of silver nitirate and 35.28 mg of sodium citrate are weighed and dissolved in 18.4 mL of de-ionized water, and stirred for 1.5 min, followed by slowly adding dropwise 1.6 mL of an 0.01 mol/L alcoholic solution of sodium borohydride obtained by dissolving 3.8 mg of sodium borohydride in 10 mL of ethanol. The mixture is stirred for additional 2 min to give a $1\times10^{-3}$ mol/L Ag nanoparticle sol. 0.01 g of polyvinylpyrrolidone (PVP) is weighed and dissolved in 7 mL of de-ionized water, followed by adding 2 mL of the Ag metal nanoparticles and stirring for 12 h. $6\times10^{-3}$ mol of tetraethyl orthosilicate is weighed and dissolved in 10 ml of ethanol, after which the treated Ag metal nanoparticles, 2.9 mL of 2 mol/L solution of calcium nitrate, 4 mL of 1 mol/L solution of scandium nitrate, and 4 ml of 0.05 mol/L solution of cerium nitrate are added in sequence under stirring. The solution is adjusted with nitric acid to pH of 3~4, and then placed in a 85° C. water bath to react for 4 hours and drying in a 100° C. oven for 12 hours to give a precursor, which is milled and placed in a muffle furnace for thermal treatment at 900° C. for 3 h. The resulted mixture is calcinated and reduced at 1300° C. in a 95% $N_2$+5% $H_2$ weakly reductive atmosphere in a tubular furnace for 5 h. After cooling to room temperature, $Ca_{2.9}Sc_2Si_3O_{12}:0.1Ce^{3+}$ with $1\times10^{-3}$ Ag silicate fluorescent powder is obtained.

Figure 2:
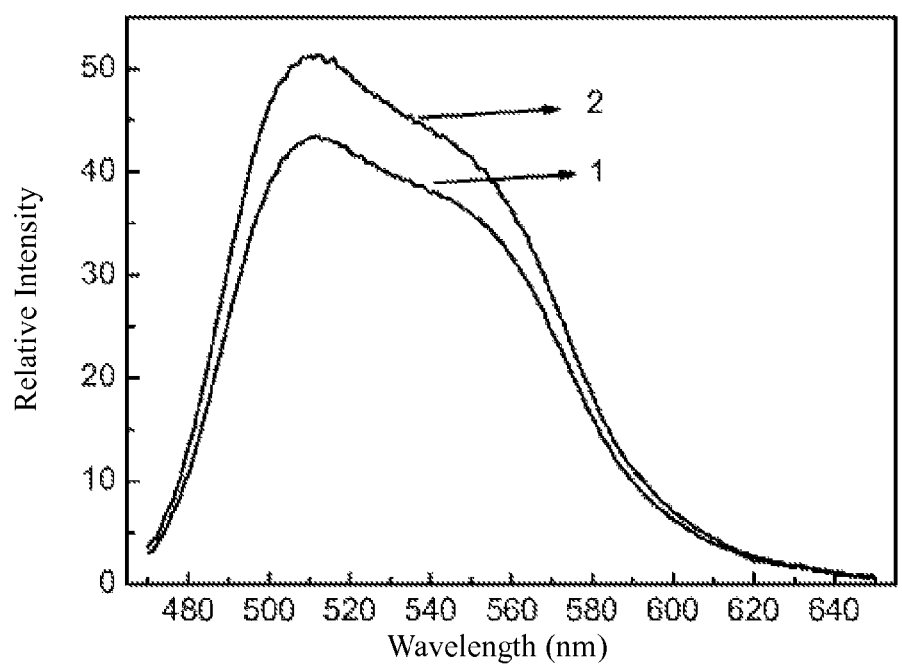
FIG. 2 shows the emission spectra of the silicate fluorescent powder prepared in Example 1 of the present invention and the fluorescent powder prepared in the Comparative Example, respectively, under the excitation of 460 nm blue light; wherein curve 1 is the emission spectra of the fluorescent powder prepared in Example 1, and curve 2 is the emission spectra of the fluorescent powder prepared in the Comparative Example.

The emission spectra of this silicate fluorescent powder and the fluorescent powder prepared in a Comparative Example, respectively, under the excitation of 460 nm blue light are shown in FIG. 2, wherein curve 1 is the emission spectra of the fluorescent powder prepared in the present Example, and curve 2 is the emission spectra of the fluorescent powder prepared in the Comparative Example. It can be seen from the emission spectra curves that the luminescent intensity of the fluorescent powder can be significantly increased by incorporating metal nanoparticles.

Figure 3:
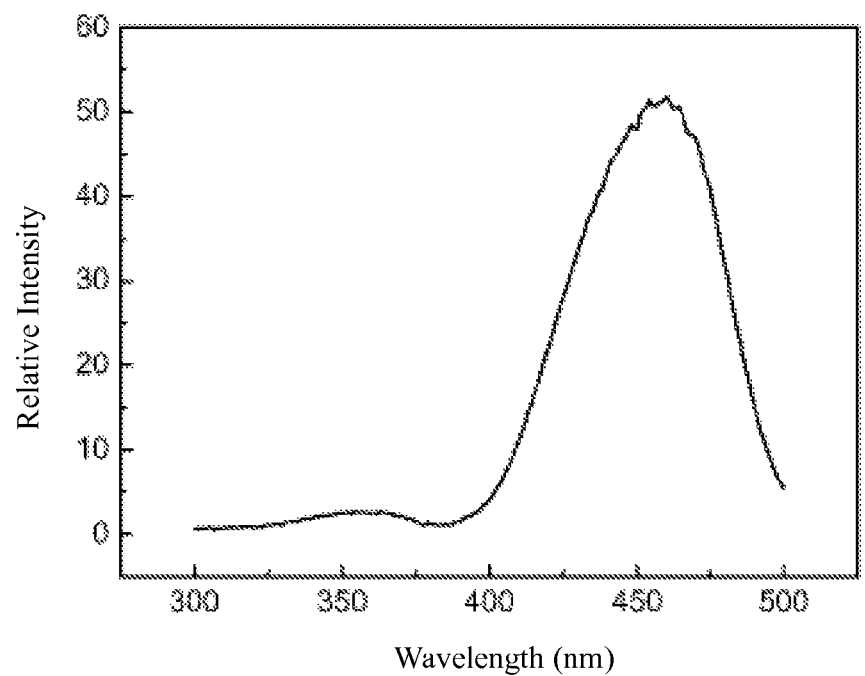
FIG. 3 shows the excitation spectrum of the silicate fluorescent powder prepared in Example 1 of the present invention at a monitoring wavelength of 505 nm.

In addition, the excitation spectrum of the silicate fluorescent powder prepared in the present Example at a monitoring wavelength of 505 nm is shown in FIG. 3. It can be seen from FIG. 3 that the silicate fluorescent powder prepared in the present Example has a high luminescent intensity.

Figure 4:
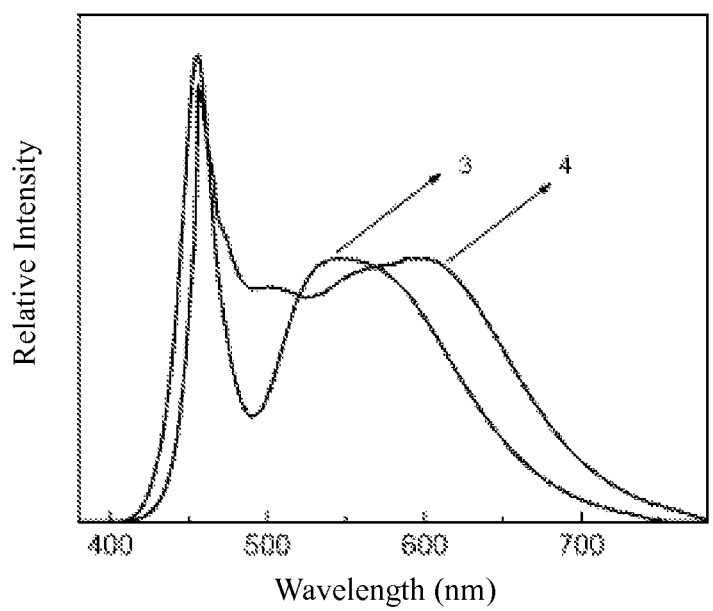
FIG. 4 shows the emission spectra of the mixture of the silicate fluorescent powder prepared in Example 1 of the present invention and $Sr_2Si_5N_8$:Eu red fluorescent powder and YAG yellow fluorescent powder, respectively, after being encapsulated with a blue-light LED chip; wherein curve 3 is the emission spectrum of the mixture of the silicate fluorescent powder prepared in Example 1 and $Sr_2Si_5N_8$:Eu red fluorescent powder after being encapsulated with a blue-light LED chip, and curve 4 is the emission spectrum of YAG yellow fluorescent powder after being encapsulated with a blue-light LED chip.

The emission spectrum of the mixture of the silicate fluorescent powder prepared in the present Example and $Sr_2Si_5N_8$:Eu red fluorescent powder after being encapsulated with a blue-light LED chip is shown as curve 3 in FIG. 4, and curve 4 in FIG. 4 is the emission spectrum of YAG yellow fluorescent powder after being encapsulated with a blue-light LED chip. It can be seen from FIG. 4 that the white-light LED encapsulating the mixture of the silicate fluorescent powder prepared in the present Example and $Sr_2Si_5N_8$:Eu red fluorescent powder has a color temperature of 4860, a color-rendering index of 90%, and a luminescent efficiency which reaches 110% of that of the white-light LED encapsulating the YAG yellow fluorescent powder; and the white-light LED encapsulating the YAG yellow fluorescent powder has a color temperature of 6400, a color-rendering index of 78. Accordingly, a white-light LED having a high luminescent efficiency, a high color-rendering index, and a low color temperature is obtained by encapsulating the green fluorescent powder of the present invention and a red fluorescent powder.

EXAMPLE 2

Silicate fluorescent powder having a chemical formula of $Ca_2Sr_{0.8}Sc_{1.8}Si_{2.9}O_{11.315}:0.01Ce^{3+}$ with $1\times10^{-4}$ Au 1.64 mg of chloroauric acid is weighed and dissolved in 7.5 mL of ethanol. After complete dissolving, 5.6 mg of sodium citrate and 2.4 mg of hexadecyl trimethyl ammonium bromide are added under stirring. 0.76 mg of sodium borohydride is weighed and dissolved in 10 mL of ethanol to give 10 mL of 0.002 mol/L alcoholic solution of sodium borohydride. To the alcoholic solution of chloroauric acid is added 2.5 mL of the alcoholic solution of sodium borohydride under stirring. The reaction is continued for another 30 min to give an Au nanoparticle sol having an Au content of $4\times10^{-4}$ mol/L. 0.2 g of polyvinylpyrrolidone is weighed and dissolved in 5 mL of de-ionized water, followed by adding 0.5 mL of $4\times10^{-4}$ mol/L Au metal nanoparticles and stirring for 24 h. $5.8\times10^{-3}$ mol of tetraethyl orthosilicate is weighed and dissolved in 10 ml of ethanol, after which the treated Ag metal nanoparticles, 2 mL of 2 mol/L solution of calcium chloride, 0.8 mL of 2 mol/L solution of strontium nitrate, 3.6 mL of 1 mol/L solution of scandium nitrate, and 0.4 ml of 0.05 mol/L solution of cerium nitrate are added in sequence under stirring. The solution is adjusted with nitric acid to pH of 3~4, and then placed in a 60° C. water bath to react for 5 hours and drying in a 120° C. oven for 8 hours to give a precursor, which is milled and placed in a muffle furnace for thermal treatment at 700° C. for 5 h. The resulted mixture is calcinated and reduced at 1500° C. in a 95%/$N_2$+5% $H_2$ weakly reductive atmosphere in a tubular furnace for 2 h. After cooling to room temperature, $Ca_2Sr_{0.8}Sc_{1.8}Si_{2.9}O_{11.315}$:0.01$Ce^{3+}$ with $1\times10^{-4}$ Au silicate fluorescent powder is obtained.

EXAMPLE 3

Silicate fluorescent powder having a chemical formula of $Ca_{1.5}Ba_{0.7}Sr_{1.0}Sc_{1.5}Y_{0.6}Si_{3.3}O_{13.025}$:0.05$Ce^{3+}$ with $2\times10^{-3}$ Pt 5.2 mg of chloroplatinic acid is weighed and dissolved in 17 mL of ethanol. After complete dissolving, 8 mg of sodium citrate and 1.2 mg of sodium dodecylsulphonate are added under stirring. 0.4 mL of $1\times10^{-3}$ mol/L alcoholic solution of sodium borohydride obtained by dissolving 0.4 mg of sodium borohydride in 10 mL of ethanol is then slowly added dropwise. After reacting for 5 min, 2.6 mL of $1\times10^{-2}$ mol/L solution of hydrazine hydrate is added. The reaction is continued for 40 min to give the a Pt nanoparticle sol having a Pt content of $5\times10^{-4}$ mol/L. 0.15 g of 3-aminopropyl trimethyl siloxane is weighed and dissolved in 6 mL of de-ionized water, followed by adding 8 mL of $5\times10^{-4}$ mol/L Pt metal nanoparticles and stirring for 18 h. $6.6\times10^{-3}$ mol of tetraethyl orthosilicate is weighed and dissolved in 10 ml of ethanol, after which the treated Pt metal nanoparticles, 1.5 mL of 2 mol/L solution of strontium sulfate, 0.7 mL of 2 mol/L solution of calcium barium nitrate, 1 mL of 2 mol/L solution of strontium nitrate, 3 mL of 1 mol/L solution of yttrium chloride and 2 ml of 0.05 mol/L solution of cerium nitrate are added in sequence under stirring. The solution is adjusted with nitric acid to pH of 3~4, and then placed in a 75° C. water bath to react for 4 hours and drying in a 110° C. oven for 3 hours to give a precursor, which is milled and placed in a muffle furnace for thermal treatment at 1000° C. for 3 h. The resulted mixture is calcinated and reduced at 1250° C. in a 95% $N_2$+5% $H_2$ weakly reductive atmosphere in a tubular furnace for 12 h. After cooling to room temperature, $Ca_{1.5}Ba_{0.7}Sr_{1.0}Sc_{1.5}Y_{0.6}Si_{3.3}O_{13.025}$: 0.05$Ce^{3+}$ with $2\times10^{-3}$ Pt silicate fluorescent powder is obtained.

EXAMPLE 4

Silicate fluorescent powder having a chemical formula of $Ca_{2.74}Mg_{0.06}Sc_2Si_{3.1}O_{12.3}$:0.2$Ce^{3+}$ with $1\times10^{-2}$ Pd 0.43 g of palladium chloride is weighed and dissolved in 15 mL of de-ionized water. After complete dissolving, 1.1 g of sodium citrate and 0.4 g of sodium dodecylsulfate are added under stirring. 5 mL of 0.1 mol/L alcoholic solution of sodium borohydride obtained by dissolving 0.038 g of sodium borohydride in 10 mL of ethanol is then slowly added dropwise and reacted for 20 min to give a Pt nanoparticle sol having a Pt content of $5\times10^{-3}$ mol/L. 0.3 g of polyvinylpyrrolidone is weighed and dissolved in 5 mL of de-ionized water, to which is added 4 mL of $5\times10^{-3}$ mol/L Pd metal nanoparticles and stirred for 3 h. $6.2\times10^{-3}$ mol of tetraethyl orthosilicate is weighed and dissolved in 10 ml of ethanol, after which the treated Pd metal nanoparticles, 2.74 mL of 2 mol/L solution of calcium nitrate, 0.6 mL of 0.2 mol/L solution of magnesium nitrate, 4 mL of 1 mol/L solution of scandium nitrate, and 2 ml of 0.2 mol/L solution of cerous sulfate are added in sequence under stirring. The solution is adjusted with nitric acid to pH of 3~4, and then placed in a 95° C. water bath to react for 3 hours and drying in a 80° C. oven for 5 hours to give a precursor, which is milled and placed in a muffle furnace for thermal treatment at 800° C. for 5 h. The resulted mixture is calcinated and reduced at 1400° C. in a 95% $N_2$+5% $H_2$ weakly reductive atmosphere in a tubular furnace for 4 h. After cooling to room temperature, $Ca_{2.74}Mg_{0.06}Sc_2Si_{3.1}O_{12.3}$:0.2$Ce^{3+}$ with $1\times10^{-2}$ Pd silicate fluorescent powder is obtained.

EXAMPLE 5

Silicate fluorescent powder having a chemical formula of $Ca_{1.0}Sr_{1.0}Mg_{0.9}Sc_{1.9}Si_{2.95}O_{11.77}$:0.08$Ce^{3+}$ with $8\times10^{-4}$Cu 1.6 mg of cupric nitrate is weighed and dissolved in 16 mL of ethanol. After complete dissolving, 12 mg of polyvinylpyrrolidone is added under stirring. 4 mL of $1\times10^{-3}$ mol/L alcoholic solution of sodium borohydride obtained by dissolving 0.4 mg of sodium borohydride in 10 mL of ethanol is then slowly added dropwise. After reacting for additional 2 min, a $4\times10^{-4}$ mol/L Cu nanoparticle sol is obtained. $5.9\times10^{-3}$ mol of tetraethyl orthosilicate is weighed and dissolved in 10 ml of ethanol, after which the treated Cu metal nanoparticles, 1 mL of 2 mol/L solution of calcium nitrate, 1 mL of 2 mol/L solution of strontium nitrate, 6 mL of 0.3 mol/L solution of magnesium nitrate, 3.8 mL of 1 mol/L solution of scandium nitrate and 2 ml of 0.04 mol/L solution of cerium nitrate are added in sequence under stirring. The solution is adjusted with nitric acid to pH of 3~4, and then placed in a 85° C. water bath to react for 3 hours and drying in a 100° C. oven for 8 hours to give a precursor, which is milled and placed in a muffle furnace for thermal treatment at 750° C. for 5 h. The resulted mixture is calcinated and reduced at 1350° C. in a 95% $N_2$+5% $H_2$ weakly reductive atmosphere in a tubular furnace for 8 h. After cooling to room temperature, $Ca_{1.0}Sr_{1.0}Mg_{0.9}Sc_{1.9}Si_{2.95}O_{11.77}$:0.08$Ce^{3+}$ with $8\times10^{-4}$Cu silicate fluorescent powder is obtained. silicate fluorescent powder.

EXAMPLE 6

Silicate fluorescent powder having a chemical formula of $Ca_{2.88}Sc_{1.94}Y_{0.06}Si_3O_{12}$:0.12$Ce^{3+}$ with $8\times10^{-3}$ Ag 6.8 mg of silver nitrate and 70.56 mg of sodium citrate are weighed and dissolved in 18.4 mL of de-ionized water, and dissolved for 1.5 min, followed by slowly adding dropwise 3.2 mL of 0.01 mol/L alcoholic solution of sodium borohydride obtained by dissolving 7.6 mg of sodium borohydride in 10 mL of ethanol. The mixture is stirred for additional 2 min to give a $2\times10^{-3}$ mol/L Ag nanoparticle sol. 0.01 g of polyvinylpyrrolidone is weighed and dissolved in 7 mL of de-ionized water, followed by adding 8 mL of the Ag metal nanoparticles and stirring for 6 h. $6\times10^{-3}$ mol of tetraethyl orthosilicate is weighed and dissolved in 10 ml of ethanol, after which the treated Ag metal nanoparticles, 2.88 mL of 2 mol/L solution of calcium nitrate, 3.88 mL of 1 mol/L solution of scandium nitrate, 2 ml of 0.06 mol/L solution of yttrium nitrate, and 1.2 ml of 0.2 mol/L solution of cerium chloride are added in sequence under stirring. The solution is adjusted with nitric acid to pH of 3~4, and then placed in a 85° C. water bath to react for 4 hours and drying in a 100° C. oven for 6 hours to give a precursor, which is milled and placed in a muffle furnace for thermal treatment at 800° C. for 6 h. The resulted mixture is calcinated and reduced at 1450° C. in a 95% $N_2$+5% $H_2$ weakly reductive atmosphere in a tubular furnace for 5 h. After cooling to room temperature, $Ca_{2.88}Sc_{1.94}Y_{0.06}Si_3O_{12}$:0.12$Ce^{3+}$ with $8\times10^{-3}$ Ag silicate fluorescent powder is obtained.

COMPARATIVE EXAMPLE

Silicate fluorescent powder having a chemical formula of $Ca_{2.9}Sc_2Si_3O_{12}$:0.1$Ce^{3+}$ $6\times10^{-3}$ mol of tetraethyl orthosilicate is weighed and dissolved in 10 ml of ethanol, after which 2.9 mL of 2 mol/L solution of calcium nitrate, 4 ml of 1 mol/L solution of scandium nitrate, 4 ml 0.05 mol/L of 0.05 mol/L solution of cerium nitrate are added in sequence under stirring. The solution is adjusted with nitric acid to pH of 3~4, and then placed in a 85° C. water bath to react for 4 hours and drying in a 100° C. oven for 12 hours to give a precursor, which is milled and placed in a muffle furnace for thermal treatment at 900° C. for 3 h. The resulted mixture is calcinated and reduced at 1300° C. in a 95% $N_2$+5% $H_2$ weakly reductive atmosphere in a tubular furnace for 5 h. After cooling to room temperature, $Ca_{2.9}Sc_2Si_3O_{12}$:0.1$Ce^{3+}$ silicate fluorescent powder is obtained.

Described above are only preferred embodiments of the present invention, which are not intended to limit the present invention. All modifications, equivalent substitutions and improvements within the spirit and principle of the present invention shall be within the scope of the present invention.

The invention claimed is:

1. A silicate fluorescent powder, having a chemical formula of: $M^2_a M^3_b Si_c O_{[a+3(b+x)/2+2c]}$:$xCe^{3+}$ with $yM^0$, wherein $2.8 \le a \le 3.2$, $1.8 \le b \le 2.1$, $2.9 \le c \le 3.3$, $0.01 \le x \le 0.2$, $1\times10^{-4} \le y \le 1\times10^{-2}$, $M^2$ is a combination of at least one of Sr, Ba and Mg with Ca; $M^3$ is Sc or a combination of Sc with Y; $M^0$ represents a metal nanoparticle selected from one of Ag, Au, Pt, Pd and Cu nanoparticles.

2. A method for preparing a silicate fluorescent powder, comprising the steps of:
providing a $M^0$ metal nanoparticle sol;
providing a source compound of $M^2$, a source compound of $M^3$, a source compound of Si, a source compound of Ce and the $M^0$ metal nanoparticle sol according to stoichiometric ratio of corresponding elements in a chemical formula of $M^2_a M^3_b Si_c O_{[a+3(b+x)/2+2c]}$:$xCe^{3+}$ and $yM^0$, wherein $2.8 \le a \le 3.2$, $1.8 \le b \le 2.1$, $2.9 \le c \le 3.3$, $0.01 \le x \le 0.2$, $1\times10^{-4} \le y \le 1\times10^{-2}$, $M^2$ is a combination of at least one of Sr, Ba and Mg with Ca; $M^3$ is Sc or a combination of Sc with Y; $M^0$ represents a metal nanoparticle selected from one of Ag, Au, Pt, Pd and Cu nanoparticles;
adding the $M^0$ metal nanoparticle sol and the source compound of $M^2$, a source compound of $M^3$ and a source compound of Ce to an alcoholic solution of the source compound of Si to give a mixed solution;
adjusting the pH of the mixed solution to be acidic, heating in a water bath to conduct reaction, and drying to give a precursor;
pre-calcinating the precursor; and
calcinating the pre-calcinated precursor in a reductive atmosphere to give the silicate fluorescent powder.

3. The method for preparing a silicate fluorescent powder according to claim 2, wherein:
the source compound of Si is tetraethyl orthosilicate;
the source compound of $M^2$ is at least one of nitrate, sulfate and chloride of $M^2$;
the source compound of $M^3$ is at least one of nitrate, sulfate and chloride of $M^3$; and
the source compound of Ce is at least one of nitrate, sulfate and chloride of Ce.

4. The method for preparing a silicate fluorescent powder according to claim 2, wherein: a process for preparing the $M^0$ metal nanoparticle sol comprises the steps of:
dissolving a source compound of $M^0$ in a solvent, followed by adding an auxiliary dissolved in a solvent and a reductant dissolved in a solvent; after completion of the reaction, treating with a surface treating agent to give the $M^0$ metal nanoparticle sol, wherein the auxiliary is at least one of polyvinylpyrrolidone, sodium citrate, hexadecyl trimethyl ammonium bromide, sodium dodecylsulfate and sodium dodecylsulphonate;
the content of the added auxiliary in the $M^0$ metal nanoparticle sol is $1.5\times10^{-4}$ g/mL~$2.1\times10^{-3}$ g/mL;
the molar ratio of the added reductant to the $M^0$ metal ion is 1.2:1~4.8:1; and the content of the added surface treating agent in the $M^0$ metal nanoparticle sol is $1.5\times10^{-4}$ g/mL~$2.1\times10^{-3}$ g/mL.

5. The method for preparing a silicate fluorescent powder according to claim 4, wherein: in the process for preparing the $M^0$ metal nanoparticle sol,
the source compound of $M^0$ is at least one of silver nitrate, chloroauric acid, chloroplatinic acid, palladium chloride and cupric nitrate; and
the surface treating agent is at least one of polyvinylpyrrolidone and 3-aminopropyl trimethyl siloxane.

6. The method for preparing a silicate fluorescent powder according to claim 2, wherein: in the process for preparing the mixed solution, the alcohol for the alcoholic solution of the source compound of Si is ethanol.

7. The method for preparing a silicate fluorescent powder according to claim 2, wherein: in the process for preparing the precursor, the pH of the mixed solution is 3~6; the heating temperature of the water bath is 60-95° C., and the drying temperature is 80~120° C.

8. The method for preparing a silicate fluorescent powder according to claim 7, wherein: in the process for preparing the precursor, the pH of the mixed solution is adjusted with nitric acid.

9. The method for preparing a silicate fluorescent powder according to claim 2, wherein:
the temperature of the pre-calcination is 700~1000° C., and the time is 3~5 h; and
the temperature under which the precursor is calcinated in a reductive atmosphere is 1250~1500° C., and the time is 2~12 h.

10. The method for preparing a silicate fluorescent powder according to claim 9, wherein: the reductive atmosphere is one of $N_2$—$H_2$ mixed reductive atmosphere, CO reductive atmosphere and $H_2$ reductive atmosphere.

11. A silicate fluorescent powder, having a chemical formula of: $Ca_{2.9}Sc_2Si_3O_{12}$:0.1$Ce^{3+}$ with $1\times10^{-3}$ Ag, $Ca_2Sr_{0.8}Sc_{1.8}Si_{2.9}O_{11.315}$:0.01$Ce^{3+}$ with $1\times10^{-4}$Au, $Ca_{1.5}Ba_{0.7}Sr_{1.0}Sc_{1.5}Y_{0.6}Si_{3.3}O_{13.025}$:0.05$Ce^{3+}$ with $2\times10^{-3}$Pt, $Ca_{2.74}Mg_{0.06}Sc_2Si_{3.1}O_{12.3}$:0.2$Ce^{3+}$ with $1\times10^{-2}$ Pd, $Ca_{1.0}Sr_{1.0}Mg_{0.9}Sc_{1.9}Si_{2.95}O_{11.77}$:0.08$Ce^{3+}$ with $8\times10^{-4}$Cu, or $Ca_{2.88}Sc_{1.94}Y_{0.06}Si_3O_{12}$:0.12$Ce^{3+}$ with $8\times10^{-3}$ Ag.

* * * * *